(No Model.) 2 Sheets—Sheet 1.

H. BEISHEIM.
MACHINE FOR MAKING MATS OR GRATINGS.

No. 448,706. Patented Mar. 24, 1891.

Witnesses
H. G. Phillips
Thomas Durant

Inventor
Henry Beisheim
by Church & Church
his attorneys (No Model.) 2 Sheets—Sheet 2.

H. BEISHEIM.
MACHINE FOR MAKING MATS OR GRATINGS.

No. 448,706. Patented Mar. 24, 1891.

Witnesses
H. G. Phillips.
Thomas Durant

Inventor.
Henry Beisheim.
by Chamberl & Church
his attorneys.

THE NORRIS PETERS CO., PHOTO-LITHO., WASHINGTON, D. C.

UNITED STATES PATENT OFFICE.

HENRY BEISHEIM, OF ROCHESTER, ASSIGNOR TO THE NEW YORK STEEL MAT COMPANY, OF NEW YORK, N. Y.

MACHINE FOR MAKING MATS OR GRATINGS.

SPECIFICATION forming part of Letters Patent No. 448,706, dated March 24, 1891.

Application filed November 21, 1890. Serial No. 372,211. (No model.)

*To all whom it may concern:*

Be it known that I, HENRY BEISHEIM, of Rochester, county of Monroe, and State of New York, have invented certain new and useful Improvements in Machines for Making Mats or Gratings; and I do hereby declare the following to be a full, clear, and exact description of the same, reference being had to the accompanying drawings, forming a part of this specification, and to the letters of reference marked thereon.

My present invention has for its object to provide a machine for forming gratings and mats, consisting of strips crossing at an angle and mortised or let into each other for a portion of their width, substantially as shown in Patent No. 377,580, granted William C. Spelman February 7, 1888, the mat thus formed consisting of pockets or recesses, preferably open on both sides, the edges of the strips operating as scraping-surfaces to remove mud or snow from the shoes if the structure is used as a door-mat. The strips of which these mats are made are usually of steel, and their ends are fastened to a suitable frame, leaving no fastening at the joints, except the friction between the interlocking strips, and by reason of the hardness of the material considerable pressure is required to properly secure the strips together when the mortised portions accurately fit, as they should do, and, further, the strips must be accurately positioned, so that their slots will register properly, both of which operations are difficult of accomplishment by hand. With the idea, therefore, of providing a machine capable of making mats and gratings of this description I have invented the hereinafter-described machine, which I have found by practical operation is admirably adapted for the purpose; and the invention consists in certain improved constructions and combinations of parts, all as will be described, and the novel features pointed out in the claims.

Figure 1:
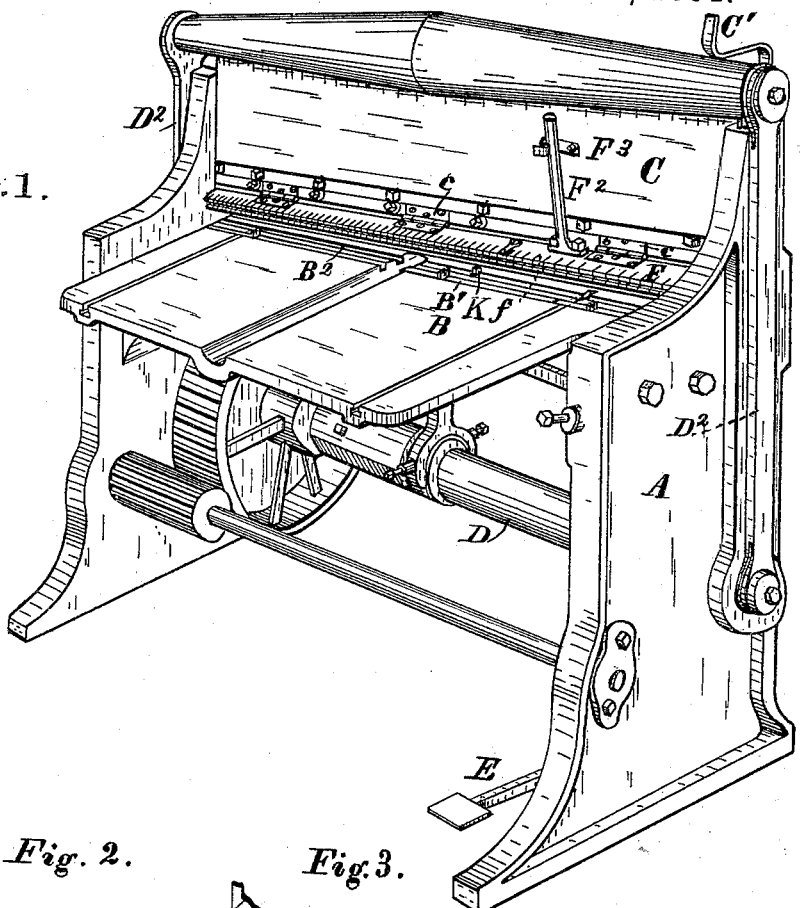
Figure 2:
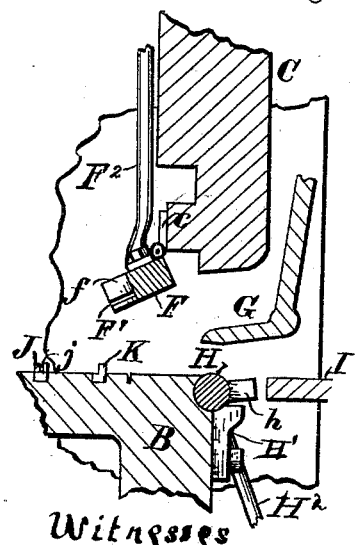
Figure 3:
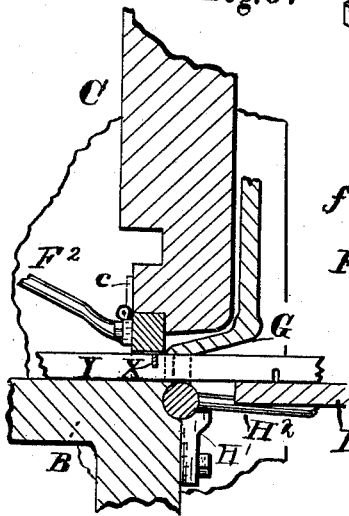
Figure 4:
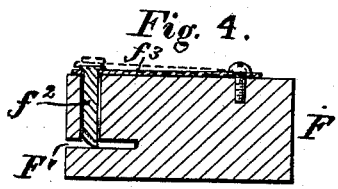
Figure 9:
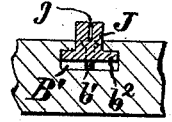
Figure 5:
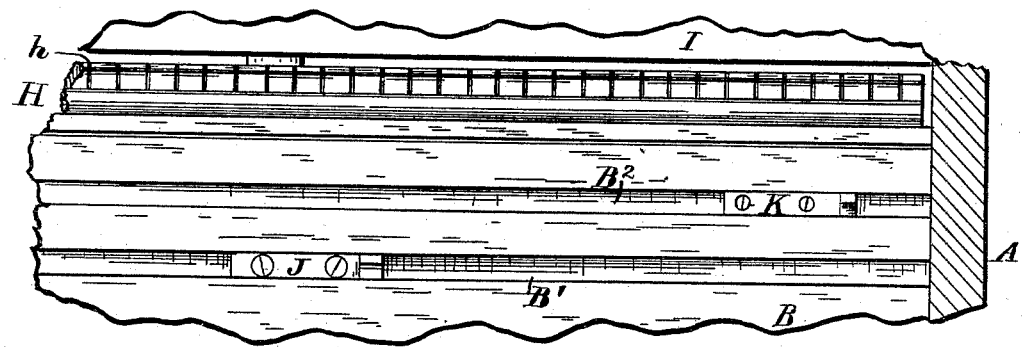
Figure 6:
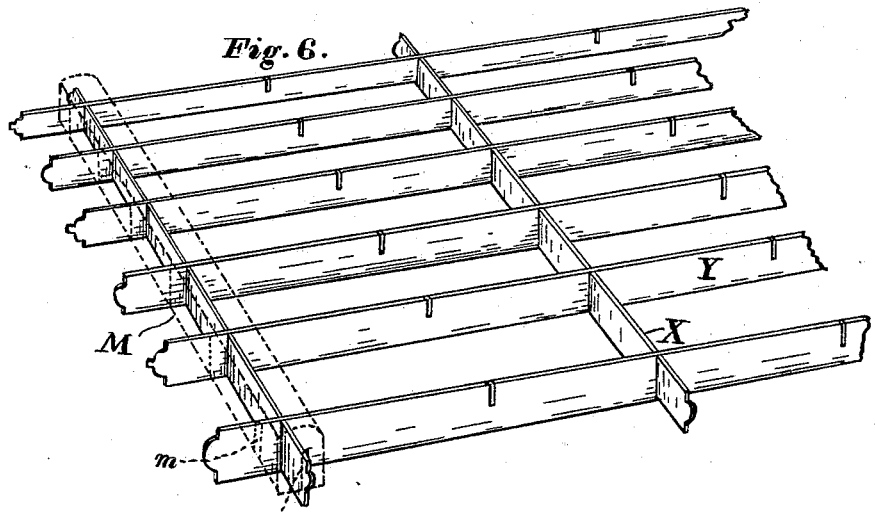
Figure 7:
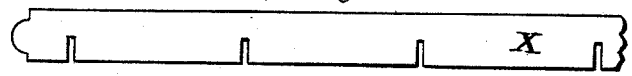
Figure 8:
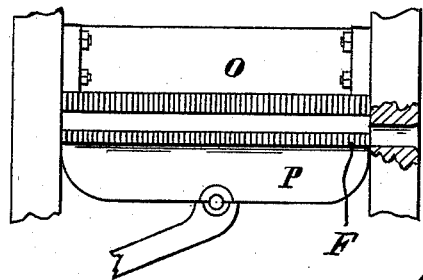

In the drawings, Figure 1 is a perspective view of a machine constructed in accordance with my invention; Fig. 2, a sectional view through a portion of the bed-plate and strip-carrying bar with the carrier raised for the application of a strip; Fig. 3, a similar view showing the position occupied by parts in operation; Fig. 4, a detail sectional view showing the strip-holding pin; Fig. 5, a top plan view of the bed-plate and spacing-bar; Fig. 6, a view of a portion of a mat with a holding and spacing bar thereon; Fig. 7, a view of one of the longitudinal mat-strips; Fig. 8, a view of a modification. Fig. 9 is a modification of the gage-fastening.

Similar letters of reference indicate similar parts.

In Fig. 1 of the drawings, while I have shown my invention as applied to such a machine as is ordinarily used for punching or shearing, said machine forms no part of it, further than as it embodies a bed-plate, a table, and a strip-carrying bar adapted to be reciprocated vertically toward and from said table, and therefore I do not deem it necessary to describe in detail the mechanism employed to cause the reciprocation of the bar.

The letter A represents the frame, B the bed-plate or work-support, and C the reciprocating bar, operating in suitable guides in the frame and connected by suitable pitmen $D^2$ with eccentrics on the ends of a main shaft D, which latter is adapted to be given a complete rotation when the trip clutch-lever E is pressed by the operator, causing the bar to come down upon the bed-plate and return again to first position until the lever is again operated, after the manner of ordinary drop-presses.

Upon the under side of bar C is located what I denominate a "strip-carrier" F, consisting of a metal bar provided with a longitudinal slot or recess F′ for containing the mat-strip to be placed and a series of transverse slots $ff$ for the accommodation of the longitudinal bars of the mat. In the present construction I prefer to pivot this carrier upon hinges $c\,c$, located on the front side of bar C, and provide the latter with a recess in its under side, so that when the carrier is swung into place beneath it it will be moved down positively, and when swung out to the position shown in Figs. 1 and 2 the edge of the slot F′ will be accessible, so that the strip can be readily applied to the carrier. This carrier is provided with a handle $F^2$ for the purpose of turning it outward from beneath the bar, and a suitable spring-catch F³ is provided on bar C, adapted to engage and retain it in raised position when desired, as in Fig. 1, and the weight of the handle will serve to bring the carrier into operative position. At one or more places in the length of the carrier I prefer to locate catches—such as shown in Fig. 4—consisting of a pin $f^2$, projecting laterally into the slot F', provided with a beveled end and held normally pressed inward by a small spring $f^3$, to which the pin is connected, the whole so arranged that when a strip is placed in the slot the pins will hold it by frictional contact and prevent accidental displacement when the carrier is moved under bar C.

G represents a pressure or holder bar, pivoted to the frame at the rear side of the bar C, having a forwardly-projecting portion arranged to come in close proximity to the rear side of the carrier to hold the body of the mat, being formed securely upon the table B, a suitable handle C', connected to said bar, preferably extending over the top of C and in convenient position to be reached by the operator standing at the front of the machine.

The bed plate or table B is provided at its rear side with a spacing-bar H, preferably arranged in suitable bearings in the bed and plates H', provided with an operating-handle H² and with transverse slots $h$, as in Figs. 2, 3, and 5, adapted to receive and properly space the longitudinal strips of the said bar, being adapted to be turned down in the position shown in Fig. 2 before the operation is commenced, and, if desired, after several strips have been applied, and to be moved up, as in Fig. 3, when the first strips are being placed in position.

A suitable table or support I is located beyond the spacing-bar, upon which the longitudinal strips rest during the forming operation.

The table B is provided with a transverse slot B', in which are located two gages J J, preferably one on each side of the machine, consisting of metal blocks provided with slots $j$ in their upper sides, as shown, arranged parallel with the slot in the strip-carrier and at such a distance from the latter when in the position shown in Fig. 3 as it is desired to have the strips apart. These gage-blocks may be permitted to slide loosely in the slot B', and may be secured in position by means of screws $b'$ entering the bed-plate or operating against the bottom of the slots and serving to hold the flanges $b^2$ on them against the overhanging edges, as shown in Fig. 9, and they may be disposed in any manner desired, and I prefer also to employ other gage-blocks K, located in slots B² in the bed-plate, arranged to engage the longitudinal strips and determine the lateral position of at least one edge of the mat being formed; but, if desired, these latter gages could be dispensed with and the spacing-bar H relied upon alone.

In forming the mats I prefer to employ the longitudinal strips represented by the letter X in the drawings, provided with slots at top and bottom, and to place the transverse strips Y on opposite sides alternately; but as far as the operation of the machine is concerned this makes no practical difference, as the strips are simply placed farther apart and the meshes formed are longer, though the pivoted spacing-bar H does co-operate in a measure when the second series of transverse strips are placed in position, as will be further on explained.

In making mats by my machine I first provide a bar M, having a longitudinal slot M' for the accommodation of the first transverse strip X, and a series of transverse slots $m$, and placing said strip X in position in M' drive in a number of longitudinal strips Y, so that the mortised portions will be engaged and the lower edge of strip X will project slightly below the bar M, giving a series of strips Y, properly spaced laterally at one end and one strip X from which to work. The operator now places this structure on the table, and under bar C places the first strip X, projecting from M in the gages J, and moves the bar H up, the strips Y passing in the slots and being accurately spaced, while the mortises in them will all be in line. Then the operator moves the handle of the presser G forward, causing the latter to press upon and hold the strips Y down upon the bed-plate and in the spacing-bar H, and the edge of slot F' in the carrier being exposed he places a strip X therein, taking care that the mortises register with the transverse slots, the spring-catches $f^2$ holding it by friction, then pressing down the handle F³, moves the carrier under bar C and engages the clutch, causing the bar C to descend and drive the strip X into engagement with longitudinal strips Y with great pressure, fastening them securely together. The mat is then drawn forward until the strip X just secured can be placed in the gage J. Then the strip-carrier is turned up and another strip X placed therein, returned and the machine operated as before, securing this in position, and so on, until the strips are all applied on one side. When the transverse strips are being applied to the longitudinal ones on one side only, it is not essential that the spacing-bar H be made movable, as the strips are simply moved along toward the end from which mats are built up; but when there are strips between the places where the new strips are applied, as in Fig. 6, it is desirable that the bar be capable of being moved down out of the way when the mat is moved forward. While this spacing-bar is useful when the mat is being started, it is by no means essential to the operation of the machine, as if the longitudinal strips are reasonably straight the strip-carrier will serve to properly space them when brought down. When the transverse strips have been applied on one side, the bar M is removed, the mat turned over, and those on the opposite side secured in position in the same manner.

By the use of this machine the mats may be put together very rapidly, and the connection between the strips at the interlocking portion is much more substantial than if made by hand.

It will be understood that instead of making the strip-carrier movable on bar C it could as well be stationary; but I prefer the present construction, as it enables the operator to more readily place the strips in position; also, instead of placing this carrier above it could be projected upward from below, the strips being slipped in from the end of the carrier, a suitable platen O being provided for holding the mat stationary, as shown in Fig. 8, against the upward thrust of the bar P.

Other modifications will readily occur to those skilled in the art, which can be made without departing from the spirit of my invention; but I have found the herein-described embodiment to answer all purposes.

I claim as my invention—

1. In a machine for making mats or grating composed of strips, the combination, with a suitable support, of a strip-carrier having the longitudinal and the transverse slots therein, substantially as described.

2. In a machine for making mats or gratings composed of strips, the combination, with a suitable support, of a strip-carrier having the longitudinal and the transverse slots and a spacing-bar having slots corresponding with the transverse slots in the carrier, substantially as described.

3. The combination, with the support or table having the gage thereon, of the reciprocating bar and the strip-carrier thereon having the longitudinal and the transverse slots, substantially as described.

4. The combination, with the support or table, of the reciprocating bar and the strip-carrier pivoted thereon and adapted to be swung out from beneath the bar, having the longitudinal and the transverse slots, substantially as described.

5. The combination, with the support or table, of the reciprocating bar and the strip-carrier adapted to be moved out from beneath the bar and having the longitudinal and transverse slots, substantially as described.

6. The combination, with the support or table, of the reciprocating bar, a strip-carrier thereon, the presser, and the spacing-bar on the table, substantially as described.

7. The combination, with the support or table, of the reciprocating bar, the strip-carrier pivoted thereto, and the gage having the slotted end, substantially as described.

8. The combination, with the support or table, of the reciprocating strip-carrier having the longitudinal and the transverse slots and the pivoted spacing-bar having slots corresponding with those in the carrier, substantially as described.

9. The combination, with the support or table, of the reciprocating bar, the strip-carrier pivoted thereto, having the operating-handle, and the catch for retaining said handle when the carrier is raised, substantially as described.

10. The combination, with the strip-carrier having the longitudinal slot, of the spring-operated catches projecting into said slot for holding the strip, substantially as described.

11. The combination, with the reciprocating bar, of the strip-carrier thereon adapted to be moved beneath the bar, having the longitudinal slot and the spring-operated catches projecting into said slot for holding the strip, substantially as described.

HENRY BEISHEIM.

Witnesses:
F. W. KELLER,
FREDERIC BOND.